March 7, 1961  R. A. GUIDAL ET AL  2,974,316
SHAFT-TO-DIGITAL CONVERTER
Filed Dec. 21, 1959  2 Sheets-Sheet 1

INVENTORS
GEORGE S. STRINGFELLOW
RONALD A. GUIDAL
BY
*Paul A. Critchlow*
ATTORNEYS United States Patent Office 2,974,316
Patented Mar. 7, 1961

2,974,316

SHAFT-TO-DIGITAL CONVERTER

Ronald A. Guidal, 4918 Gardena Ave., San Diego 10, Calif., and George S. Stringfellow, 4371 Mount Everest, San Diego 17, Calif.

Filed Dec. 21, 1959, Ser. No. 861,154

6 Claims. (Cl. 340—347)

(Granted under Title 35, U.S. Code (1952), sec. 266)

The invention described herein may be manufactured and used by or for the Government of the United States of America for governmental purposes without the payment of any royalties thereon or therefor.

This invention relates to a shaft-to-digital converter and more particularly to a shaft-to-digital converter capable of sensing the amount and speed or direction of rotation of the associated shaft.

There has been a long felt need in the prior art for a shaft-to-digital converter capable of being turned indefinitely in either direction without limitation utilizing direct shaft-to-digital conversion as opposed to shaft-to analog voltage-to-digital conversion. The prior art shaft-to-digital converters utilizing this latter technique had the main disadvantages of excessive bulk and drift-sensitive circuits which required constant maintenance and calibration. This need also extends to suitable converting means for digitizing linear movements, since the same prior art limitations are applicable.

It is thus an object of the present invention to provide a shaft-to-digital converter which does not utilize an intermediate analog conversion.

Another object is the provision of a shaft-to-digital converter which utilizes efficient logical design circuitry.

A further object of the invention is to provide a shaft-to-digital converter which is simple and relatively maintenance free.

Still another object is to provide a shaft-to-digital converter utilizing an extremely small number of memory elements in the conversion process.

Yet another object of the invention is the provision of a shaft-to-digital converter which utilizes principles equally applicable to the digitizing of linear movement.

According to the invention, a commutator having a plurality of conductive and insulated sections is mechanically coupled to the shaft of interest. Two electrical sliding contacts are mounted to ride on the commutator, alternately making connection with the conductive and insulating portions as the commutator rotates. A third common contact is connected electrically to the conductive portion of the commutator at all times. A continuity sensing means which can utilize magnetic core design is connected to the three above mentioned contacts. The purpose of this is to sense the continuity or lack of continuity existing between the common contact and each of the other two contacts periodically. This information is then taken out in binary form. The converter, which can also utilize magnetic core logic design, combines these two inputs along with an alternating binary signal to produce an output having a net count dependent upon the amount of rotation of the shaft.

Obviously these principles can be applied to linear motion by making the commutator of linear construction and mechanically coupling it to the moving object of interest. Brushes or sliding contacts can be utilized in the same manner to sense direction and amount of movement. In other words the converter will digitize any two-variable two-condition input, where the condition is reversed with a reversal of the movement being detected and digitized.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
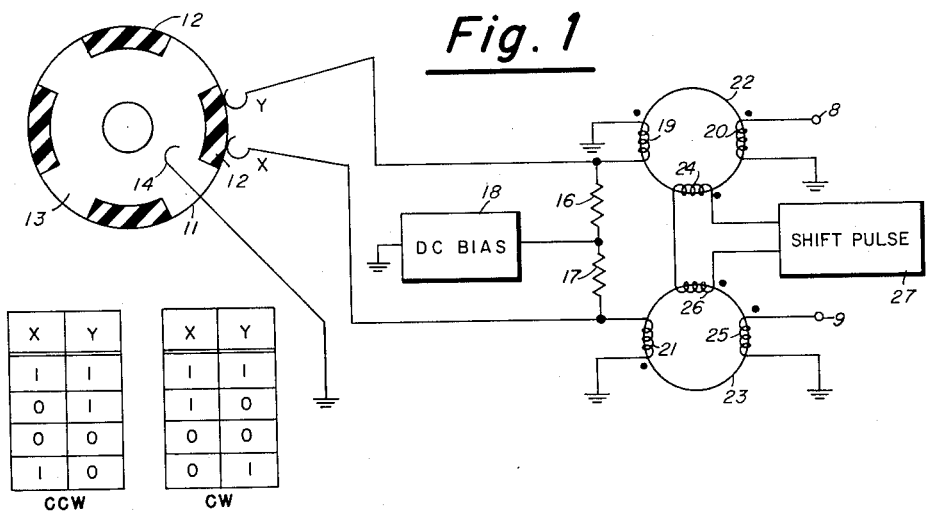
Fig. 1 is a schematic representation of the commutator wheel and continuity sensing means.

Referring now to Fig. 1 there is shown commutator wheel 11 having insulated segments 12 and conductive segments 13. Common contact 14 is connected to ground. output contacts X and Y are connected to resistors 16 and 17, to D.C. bias 18, and through coils 19 and 21 of magnetic cores 22 and 23, respectively, back to ground. Windings 24 and 26 of cores 22 and 23, respectively, are connected in parallel and to shift pulse generator 27.

Figure 2:
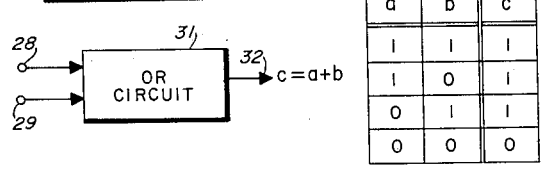
Fig. 2 is a mathematical representation of an OR block and its associated truth table.

Referring to Fig. 2 there is shown input terminals 28 and 29 connected to OR circuit 31 which in turn is connected to output terminal 32.

Figure 3:
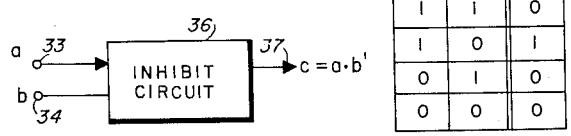
Fig. 3 is a mathematical representation of an inhibit block and its associated truth table.

In Fig. 3 input terminal 33 is connected to the signal input of inhibit circuit 36 and input terminal 34 is connected to the inhibit input of inhibit circuit 36, the output of which is connected to output terminal 37.

Figure 4:
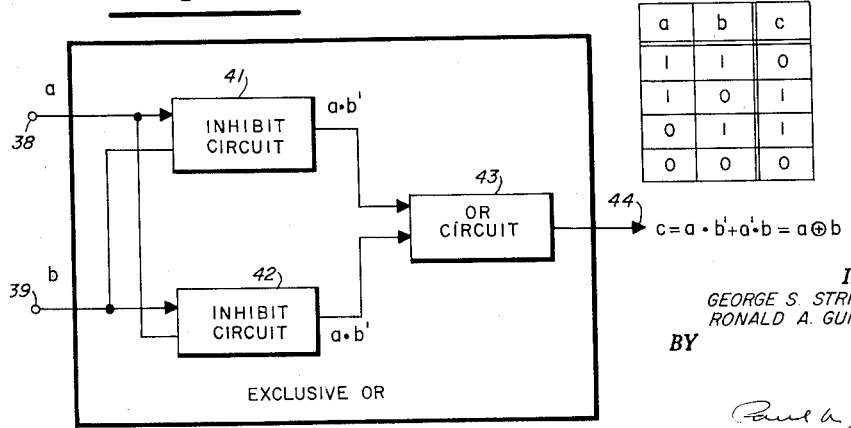
Fig. 4 is a mathematical representation of an exclusive OR block and its associated truth table.

Referring now to Fig. 4, input terminals 38 and 39 are connected to the inputs of inhibit circuits 41 and 42, respectively, and to the inhibit inputs of inhibit circuits 42 and 41, respectively. The outputs of inhibit circuits 41 and 42 are connected to the input of OR circuit 43, the output of which is connected to output terminal 44.

Figure 5:
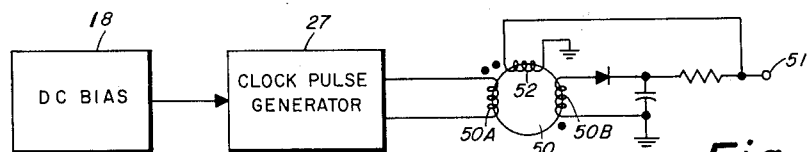
Fig. 5 is a block diagram of a binary code alternator.

Referring to Fig. 5, D.C. bias 18 is connected to clock pulse generator 27, the output of which is connected to input winding 50A of core 50. Output winding 50b is connected to output terminal 51 and inhibit winding 52.

Figure 6:
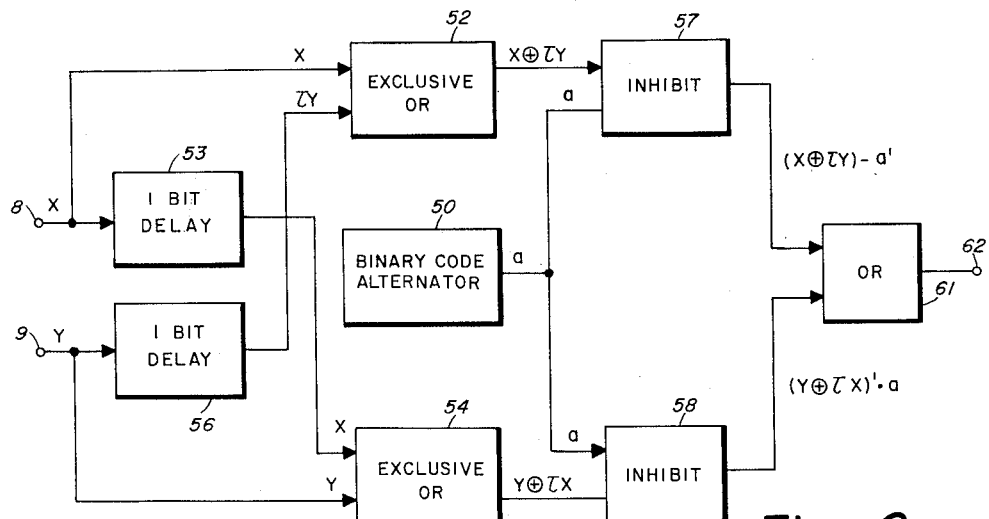
Fig. 6 is a block diagram and mathematical approach of the converter of the present invention.

Referring to Fig. 6, input terminal 8 is connected to the input of exclusive-OR circuit 52 and to one-bit-delay circuit 53. Input terminal 9 is connected to the input of exclusive-OR circuit 54 and to one-bit-delay circuit 56. The output of one bit delay circuit 53 is connected to an input of exclusive-OR 54, and the output of one-bit-delay 56 is connected to exclusive-OR circuit 52. The output of exclusive-OR circuit 52 is connected to the signal input of inhibit circuit 57, and the output of exclusive-OR circuit 54 is connected to the inhibit input of inhibit circuit 58. Binary code alternator 50 is connected to the signal input of inhibit circuit 58 and to the inhibit input of inhibit circuit 57. The outputs of inhibit circuits 57 and 58 are connected to the inputs of OR circuit 61, the output of which is connected to output terminal 62.

Figure 7:
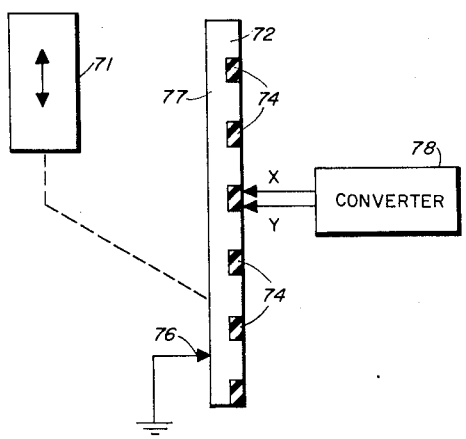
Fig. 7 is a diagram showing the present invention as applied to linear motion.

Referring to Fig. 7, there is shown mass 71 mechanically coupled to commutator 72, having a conductive portion 73 and insulated segments 74. Sliding contacts X and Y are contacting insulated segment 74, and sliding contact 76 is contacting conductive portion 77 of commutator 72. Contacts X and Y are connected to converter 78.

Operation

Referring back to Fig. 1, the operation of the commutator wheel and continuity sensing circuit will be described. In the position shown there is no continuity between common contact 14 and contacts X and Y. Thus, current will flow from D.C. bias source 18 through resistors 16 and 17, and through input windings 19 and 21 of cores 22 and 23, respectively, to ground. In this status, coils 19 and 26 magnetize cores 22 and 23, in one polarity, to saturation. A shift pulse from shift pulse generator 27 will be coupled magnetically through windings 24 and 26 to output windings 20 and 25, respectively, since windings 24 and 26 magnetize cores 22 and 23 in the opposite polarity. This, then, is defined as the 1 state for both X and Y and is noted in the respective truth tables for both clockwise and counter-clockwise rotation to be the arbitrary starting state for illustrative purposes. If commutator wheel 11 is rotated counterclockwise, the first change in condition will be that contact X will move to the conductive portion indicated at 13. At this point conduction will be established between common contact 14 and contact X, resulting in the D.C. bias flowing through contact X to ground through contact 14 short circuiting input winding 19 on core 22. This condition will not allow a shift pulse from shift pulse 27 to be magnetically coupled to output winding 20, resulting in the 0 condition, since core 22 is already magnetized in this polarity. Contact Y is still insulated so core 23 will still be in the 1 condition, i.e., a shift pulse from shift pulse generator 27 will be magnetically coupled to output winding 25. Thus, the second condition is $X=0$ and $Y=1$ as shown by the clockwise truth table. The next condition change will take place when contact Y enters the conductive portion short circulating winding 21 of core 23, resulting in a 0 condition of this core. At this point both X and Y will be in the 0 condition as indicated by the third pair of the clockwise truth table. The next condition change will result in X returning to the insulated portion of commutator wheel 11 which will return core 22 to the 1 state, leaving core Y in the 0 or conducting state, as further indicated by the clockwise truth table. The counter-clockwise truth table, of course, operates in the reverse fashion by rotating commutator wheel 11 counterclockwise resulting in the code sequence indicated. The output then from windings 20 and 25 will vary or change in opposite fashion, depending upon which way the commutator wheel is rotated.

Referring now to Fig. 2 OR circuit 31 merely performs a binary addition of signals present at input terminals 28 and 29, i.e., if there is an input at either 28 or 29 or both, there will be an output at output terminal 32. This is illustrated in the accompanying binary truth table.

Referring to Fig. 3 there is shown an inhibit block 36 which has a signal input terminal 33 and an inhibit input terminal 34. This inhibit circuit is conventional in that it produces an output at terminal 37 when there is an input at terminal 33 and no input at terminal 34. Expressed in Boolean logic this will be $C=A.B^1$, i.e., when A is 1 and B is 0, C will=1. This is further indicated by the associated truth table. Since inhibit circuits are conventional and well-known in digital systems, an explanation is deemed unnecessary.

Referring now to Fig. 4, an exclusive-OR block is shown comprising two inhibit circuits and one OR circuit. Again, since the operation of these circuits is well-known and conventional in the logic art, a detailed description is not deemed necessary. It is pointed out that as the inputs at 38 and 39 are crossed, i.e., one appears as a signal to inhibit circuit 41 and as an inhibit input to inhibit circuit 42 with the other appearing as a signal input to inhibit circuit 42 and an inhibit input to inhibit circuit 41, the outputs will be complementary and when added in OR circuit 43 result in the exclusive-OR operation, i.e., an output at 44 will be present when there is an input at either A or B but not both A and B, as indicated by the accompanying truth table, and in Boolean logic by $C=A.B^1+A^1.B=A\oplus B$.

Referring now to Fig. 5, shift pulse generator 27 is connected to input winding 50A of core 50, the output winding 50B is connected to inhibit winding 52. Thus each time a 1 appears at the output, inhibit winding 52 is energized inhibiting core 50 which produces a 0 at the next shift pulse. The following 1 generated by shift pulse generator 27 is passed through, coupled to winding 50B which again energizes inhibit winding 52, resulting in the next bit being a 0. Thus, an oscillation of 0's and 1's will result at output terminal 51.

Referring now to Fig. 6, the output of Fig. 1 at output terminals 8 and 9, the X and Y outputs respectively, are connected to corresponding terminals 8 and 9 of Fig. 6. One bit delay circuit 53 delays the X signal by one digit indicated by $tX$, and applies it to one input of exclusive OR circuit 54 and one bit delay circuit 56 delays the Y input by one bit or digit, indicated by $tY$, and applies its output to one input of exclusive-OR circuit 52. The X output is applied directly to the other input of exclusive-OR circuit 52 and the Y output is applied directly to the other input of exclusive-OR circuit 54. The inputs to exclusive-OR circuit 52 will be X and $tY$. The input to exclusive-OR circuit 54 expressed in Boolean logic will be Y and $tX$. The output of exclusive-OR circuit 52 will then be $X.tY^1+X^1.tY$. The output of exclusive-OR circuit 54 will be $Y.tX^1+Y^1.tX$. The output from these expressions can be further condensed to a shorthand notation of $X\oplus tY$ and $Y\oplus tX$. The output of exclusive-OR circuit 52 is then applied as a signal input to inhibit circuit 57, the inhibit input of which is connected to binary code alternator 59. This signal will be referred to as $a$. Thus the output of inhibit circuit 57 will be $(X\oplus tY).a^1$. The output of exclusive-OR circuit 54 is applied as the inhibit signal to inhibit circuit 58 which has as its signal input $a$. Thus, the output of inhibit circuit 58 will be $(Y\oplus tX)^1.a$. The outputs of inhibit circuits 57 and 58 are added together in OR circuit 61, the output of which will be simply the Boolean addition of the two inputs.

The associated truth table for clockwise and counter-clockwise rotation is shown below.

|  | Clockwise | Counter-Clockwise |
| --- | --- | --- |
| X | 1001 | 1100 |
| Y | 1100 | 1001 |
| Exclusive OR 52 | 1111 | 0000 |
| Exclusive OR 54 | 0000 | 1111 |
| $a$ | 1010 | 1010 |
| Inhibit 57 | 0101 | 0000 |
| Inhibit 58 | 1010 | 0000 |
| Output | 1111 | 0000 |

Referring to the above truth table for clockwise rotation of commutator 11, and referring to both Figs. 1 and 10, the maximum rate of clockwise rotation of commutator 11 will be described. Taking the position shown as the starting position of commutator 11, it is seen that a 1 will be generated at terminal 8 due to the non-conductive path between the X contact and contact 14. Rotating commutator 11 clockwise, the next digit or binary signal seen at the output will be a 0 since the contact X will now be on conductive portion 13, resulting in continuity. Another increment of rotation will place contact X further along the conductive section 13 and result in another 0 output. A further increment of rotation will place contact X on an insulated portion of commutator 13 resulting in a 1 output. Thus for four increments of rotation of commutator 11 starting from the position shown in Fig. 1, the output from the X channel will be 1001. The output from Y in the starting position will be a 1. In the next increment of rotation the Y contact will still be insulated from contact 14, following which, on the next two increments of rotation, the Y contact will be shorted to contact 14, resulting in two 0's. Thus, the output from the Y channel during this portion of rotation will be 1100. These outputs will then be applied to an input of exclusive-OR circuit 52 and an input of exclusive-OR circuit 54, respectively, as shown in Fig. 10. The inputs will also be delayed one bit by one bit delay circuits 53 and 56. Thus the second input to exclusive-OR circuit 52 would be the Y output delayed one bit or 0110 and the second input to exclusive OR circuit 54 would be the X input delayed one bit or 1100. Since the exclusive OR circuit will pass a 1 when one and only one of its inputs is 1, the output of exclusive-OR circuit 52 will be 1111, and the output of exclusive-OR circuit 54 will be 0000. At this point, it is pointed out that the maximum rotation of commutator 11 which this system is capable of accurately sensing will be that rotation which produces an output equal in time duration to the signal $a$, i.e., the shift register pulse frequency. For simplicity this is the case shown, i.e., the shift pulse is in sync with the rotation of commutator 11. The output from binary code alternator 59 is shown at $a$ in the truth table as a 1010. This output will inhibit inhibit circuit 57 which has as its signal input, in this instance, solid 1's. Thus, an output will be present from inhibit circuit 57 only when $a$ is 0 which leaves 0101. Inhibit circuit 58 is inhibited by the output from exclusive OR circuit 54. Since this is solid 0's in this case, there will be no inhibit pulse and the output of inhibit circuit 58 will be $a$ or 1010. These two signals are applied to the inputs of OR circuit 61 which simply add the two inputs together giving us 1111 on the output. This then is the signal for maximum speed clockwise rotation.

Referring now to the counter-clockwise side of the truth table, if the same arbitrary starting position is taken as shown in Fig. 1, the first outputs will be a pair of 1's as in Fig. 1. One increment of counter-clockwise rotation will place the Y contact on the conductive portion and leave the X contact on the insulated portion of commutator 11. Thus the output from X will be 1 and the output from Y will be 0. A further increment of rotation will place both X and Y on the conductive portion of commutator 11 resulting in two 0's. One more increment of rotation places Y back on the insulated portion 12 of commutator wheel 11 and leaves X on the conductive portion resulting in a 0 from the X channel and a 1 from the Y channel. This can be verified by the above truth table. Thus exclusive-OR circuit 52 has X as 1 input and Y delayed by one increment or bit as its second input. This will result in a 1100 and a 1100 from the X channel and the one bit delay circuit 53, respectively. The output of the exclusive-OR circuit 52 will then be 0000 since there will never be a time when one and only one input is 1. The input to exclusive-OR circuit 54 will then be the undelayed Y signal 1001 and the delayed X signal 0110 which will result in one and only one of the channels of the inputs having a 1 at all times and an output of solid 1's. Since inhibit circuit 58 is inhibited constantly, the output will be solid 0's. Since the signal input to inhibit circuit 57 is solid 0's, no output will be present and with no input to OR circuit 61 the output will be solid 0's as is indicated.

Thus, it is seen that maximum clockwise rotation results in a solid 1 output and maximum counter-clockwise rotation results in a solid 0 output. If the one extreme is solid 1's and the other extreme is solid 0's, it would follow logically that if the commutator is not moved the output will be a string of alternate ones and zeroes. This is shown by the following truth table:

|  | Clockwise | | | |
| --- | --- | --- | --- | --- |
|  | Position 1 | Position 2 | Position 3 | Position 4 |
| X | 1111 | 0000 | 0000 | 1111 |
| Y | 1111 | 1111 | 0000 | 0000 |
| Exclusive-OR 52 | 0000 | 1111 | 0000 | 1111 |
| Exclusive-OR 54 | 0000 | 1111 | 0000 | 1111 |
| $a$ | 1010 | 1010 | 1010 | 1010 |
| Inhibitor 57 | 0000 | 0101 | 0000 | 0101 |
| Inhibitor 58 | 1010 | 0000 | 1010 | 0000 |
| Output | 1010 | 0101 | 1010 | 0101 |

Position 1 is again taken to be the condition as shown in Fig. 1. As was mentioned previously, the output, if the wheel is at rest in the position as shown, will be a string of solid 1's from both the X and Y channels. Thus the input to exclusive-OR circuits 52 and 54 will be a string of solid 1's. Since neither input is ever 1 when the other is 0, there will be no outputs from exclusive-OR circuits 52 and 54. Thus inhibit circuit 57 will have no output. No output from exclusive-OR circuit 54 results in no inhibit pulse in inhibit circuit 58. Thus the output of inhibit circuit 58 will be the output from binary code alternator 59 or $a$. Since there is no output from inhibit circuit 57, and $a$ is applied to the input of OR circuit 61, the output will then be in the same phase as $a$ or 1010 as shown.

In position 2, in a clockwise rotation, the X contact is now on the conductive portion 13 resulting in an output of solid 0's if left resting in this position. The Y contact will then still be insulated resulting in an output of solid 1's. The outputs then from exclusive-OR circuits 52 and 54 will be both solid 1's, since 1 input will always be 0 and the other input will always be 1. This will result in inhibit circuit 58 passing nothing since it will always be inhibited, and inhibit circuit 57 passing the opposite phase of $a$ since $a$ will inhibit the input from exclusive-OR circuit 52. Thus OR circuit 61 will merely pass the complement of $a$ or 0101.

Position 3 would be where both the X and Y contacts are on the conductive portion 13 of commutator 11. This, of course, will result in solid 0's at the inputs of exclusive-OR circuits 52 and 54 which will result in solid 0's at the outputs of exclusive-OR circuits 52 and 54. Since there is no signal input to inhibit circuit 57, there will be no output and since there is no inhibit signal to inhibit circuit 58, the output will be again $a$ as shown under position 3 or 1010.

In position 4 the X contact is now in the insulated portion 12 of commutator 11 and the Y contact is still on the conductive portion 13. This will result in solid 1's being generated by the X channel and solid 0's being generated by the Y channel. Solid 1's will be present at the outputs of both exclusive-OR circuits 52 and 54. Again inhibit circuit 58 will be constantly inhibited, and the output of inhibit circuit 57 will be the complement of $a$ since $a$ will inhibit a string of solid ones, resulting in a single input to OR circuit of the converse of $a$ or 0101, which will also be the output signal.

Referring again to Fig. 7 the invention as applied to digitize a linear movement will be described. Mass 71 is the object whose movement in the direction indicated by arrows is to be detected and digitized. Commutator bar 72 is mechanically coupled to mass 71 by any convenient means. Contact 76 makes constant contact with conductive portion 77 of commutator 72, electrically grounding the conductive portion. Sliding contacts X and Y and 74 shown contacting insulating segment 74 are connected to the inputs of converter 78. Converter 78 can be identical to the converter shown in Fig. 10, having a sensing circuit identical to that of Fig. 1.

Movement of mass 71 in the direction indicated by the arrows will cause commutator bar 72 to move, which will in turn change the conductive status of X, Y and 76. Obviously, if commutator 72 is moved in one direction the conductive status will change to the opposite state that it would be if commutator 72 is moved in the other direction, resulting in the same input characteristic described with reference to Fig. 1.

Thus, a converter has been disclosed which can digitize any movement capable of being translated into a two-variable, two-state input.

Obviously, many modifications and variations of the present invention are possible in the light of the above teachings. For example, vacuum tube or transistor circuitry could be utilized rather than magnetic core logic circuitry. It is therefore to be understood that within the scope of the appended claims, the invention may be practiced otherwise than as specifically described.

What is claimed is:

1. A shaft to digital converter comprising commutating means mechanically coupled to a rotatable shaft, said commutating means having at least one insulating and one conducting segment integral therewith, first and second output contacts mounted in alternate physical contact with said insulating and conducting segments, a common electrical contact in constant physical and electrical contact with said conducting segment, continuity sensing means connected to said first and second output contacts and said common contact for generating a binary signal determined by continuity between said first and second output contacts and said common contact, converter means having first, second, and third inputs connected to said first and second commutator output contacts and an alternate-binary-signal generator output respectively, said converter means comprising first and second electrical delaying means each having an input connected to said first and second slidable electrical contacts' sensing means respectively, first and second exclusive-OR circuits each having an input connected to said first and second slidable electrical contacts respectively, the outputs of said first and second electrical delaying means connected to a second input of said second and first exclusive-OR circuit respectively, the output of said first exclusive-OR circuit connected to an input of a first inhibit circuit, the output of said second exclusive-OR circuit connected to inhibit a second inhibit circuit, the inhibit input of said first inhibit circuit, and the signal input of said second inhibit circuit connected to said binary code generator, the outputs of said first and second inhibit circuits connected to the inputs of an OR circuit, said converter operable to convert said inputs to a binary signal having a net count dependent upon the amount of rotation of said shaft and a net polarity dependent upon the direction of rotation of said shaft.

2. A motion converter comprising commutating means mechanically coupled to a movable mass of interest, said commutating means having at least one insulating and one conducting segment integral therewith, first and second output contacts mounted in alternate physical contact with said insulating and conducting segments, a common electrical contact in constant physical and electrical contact with said conducting segment, continuity sensing means connected to said first and second output contacts and said common contact for generating a binary signal determined by continuity between said first and second output contacts and said common contact, converter means having first, second, and third inputs connected to said first and second commutator output contacts and an alternate-binary-signal generator output respectively, said converter means comprising first and second electrical delaying means each having an input connected to said first and second slidable electrical contacts respectively, first and second exclusive-OR circuits each having an input connected to said first and second slidable electrical contacts respectively, the outputs of said first and second electrical delaying means connected to a second input of said second and first exclusive-OR circuit respectively, the output of said first exclusive-OR circuit connected to an input of a first inhibit circuit, the output of said second exclusive-OR circuit connected to inhibit a second inhibit circuit, the inhibit input of said first inhibit circuit, and the signal input of said second inhibit circuit connected to said binary code generator, the outputs of said first and second inhibit circuits connected to the inputs of an OR circuit, said converter operable to convert said inputs to a binary signal having a net count dependent upon the amount of movement of said shaft and a net polarity dependent upon the direction of movement of said shaft.

3. A shaft to digital converter comprising a commutator means rotatably coupled to a shaft of interest, having at least one insulating and one conducting segment integral therewith, first and second slidable electrical contacts in alternating physical contact with said insulating and conducting segments, a common electrical contact in constant physical and electrical contact with said conducting segment, continuity sensing means connected to said first and second output contacts and said common contact for generating a binary signal determined by continuity between said first and second output contacts and said common contact, first and second electrical delaying means having a delay time equal to the time between binary counts, each of said delaying means having an input connected to said first and second slidable electrical contacts respectively, first and second exclusive-OR circuits each having an input connected to said first and second slidable electrical contacts respectively, the outputs of said first and second electrical delaying means connected to a second input of said second and first exclusive-OR circuits respectively, the output of said first exclusive-OR circuit connected to an input of a first inhibit circuit, the output of said second exclusive-OR circuit connected to inhibit a second inhibit circuit, the inhibit input of said first inhibit circuit and the signal input of said second inhibit circuit connected to a binary code generator supplying an output of alternate binary signals, the outputs of said first and second inhibit circuits connected to the inputs of an OR circuit, whereby the output of said OR circuit will be a binary series proportional to the speed and direction of rotation of said shaft.

4. A shaft to digital converter having a commutator means rotatably coupled to a shaft of interest, with at least one insulating and one conducting segment integral therewith, first and second slidable electrical contacts in alternating physical contacts with said insulating and conducting segments, a common electrical contact in constant physical and electrical contact with said conducting segment, continuity sensing means connected to said first and second output contacts and said common contact for generating a binary signal determined by continuity between said first and second output contacts and said common contact, first and second electrical delaying means each having an input connected to said first and second slidable electrical contacts respectively, first and second exclusive-OR circuits each having an input connected to said first and second slidable electrical contacts respectively, the outputs of said first and second electrical delaying means connected to a second input of said second and first exclusive-OR circuits respectively, the output of said first exclusive-OR circuit connected to an input of a first inhibit circuit, the output of said second exclusive-OR circuit connected to inhibit a second inhibit circuit, the inhibit input of said first inhibit circuit and the signal input of said second inhibit circuit connected to a binary code generator supplying an output of alternate binary signals, the outputs of said first and second inhibit circuits connected to the inputs of an OR circuit, whereby the output of said OR circuit will be a binary series proportional to the speed and direction of rotation of said shaft.

5. A motion converter comprising commutating means mechanically coupled to a movable mass of interest, having at least one insulating and one conducting segment integral therewith, first and second slidable electrical contacts in alternating physical contact with said insulating and conducting segments, a common electrical contact in constant physical and electrical contact with said conducting segment, continuity sensing means connected to said first and second output contacts and said common contact for generating a binary signal determined by continuity between said first and second output contacts and said common contact, first and second electrical delaying means having a delay time equal to the time between binary counts, each of said delaying means having an input connected to said first and second slidable electrical contacts respectively, first and second exclusive-OR circuits each having an input connected to said first and second slidable electrical contacts respectively, the outputs of said first and second electrical delaying means connected to a second input of said second and first exclusive-OR circuits respectively, the output of said first exclusive-OR circuit connected to an input of a first inhibit circuit, the output of said second exclusive-OR circuit connected to inhibit a second inhibit circuit, the inhibit input of said first inhibit circuit and the signal input of said second inhibit circuit connected to a binary code generator supplying an output of alternate binary signals, the outputs of said first and second inhibit circuits connected to the inputs of an OR circuit, whereby the output of said OR circuit will be a binary series proportional to the speed and direction of movement of said mass.

6. A motion converter comprising commutating means mechanically coupled to a movable mass of interest, with at least one insulating and one conducting segment integral therewith, first and second slidable electrical contacts in alternating physical contact with said insulating and conducting segments, a common electrical contact in constant physical and electrical contact with said conducting segment, continuity sensing means connected to said first and second output contact for generating a binary signal determined by continuity between said first and second output contacts and said common contact, first and second electrical delaying means each having an input connected to said first and second slidable electrical contacts respectively, first and second exclusive-OR circuits each having an input connected to said first and second slidable electrical contacts respectively, the outputs of said first and second electrical delaying means connected to a second input of said second and first exclusive-OR circuits respectively, the output of said first exclusive-OR circuit connected to an input of a first inhibit circuit, the output of said second exclusive-OR circuit connected to inhibit a second inhibit circuit the inhibit input of said first inhibit circuit and the signal input of said second inhibit circuit connected to a binary code generator supplying an output of alternate binary signals, the outputs of said first and second inhibit circuits connected to the inputs of an OR circuit, whereby the output of said OR circuit will be a binary series proportional to the speed and direction of movement of said mass.

References Cited in the file of this patent
UNITED STATES PATENTS

| | | |
|---|---|---|
| 2,733,430 | Steele | Jan. 31, 1956 |
| 2,796,598 | Cartwright | June 18, 1957 |